United States Patent [19]

Chen

[11] Patent Number: 5,528,767
[45] Date of Patent: Jun. 18, 1996

[54] PROGRAMMABLE MULTI-LEVEL BUS ARBITRATION APPARATUS IN A DATA PROCESSING SYSTEM

[75] Inventor: Chang-San Chen, Taipei, Taiwan

[73] Assignee: United Microelectronics Corp., Hsinchu, Taiwan

[21] Appl. No.: 407,236

[22] Filed: Mar. 21, 1995

[51] Int. Cl.$^6$ ................................................. G06F 13/362
[52] U.S. Cl. ................ 395/293; 340/825.5; 370/85.6; 364/240; 364/240.1; 364/242.6; 364/242.92; 364/242.7; 364/242.9; 364/DIG. 1
[58] Field of Search ................................. 395/293, 287, 395/290, 729, 728, 288, 294; 340/825.5, 825.51; 370/85.6

[56] References Cited

U.S. PATENT DOCUMENTS

| | | | |
|---|---|---|---|
| 4,375,639 | 3/1983 | Johnson, Jr. | 340/825.5 |
| 4,611,297 | 9/1986 | Dudley et al. | 395/293 |
| 5,142,689 | 8/1992 | Eisenack | 395/800 |
| 5,241,632 | 8/1993 | O'Connell et al. | 395/297 |
| 5,253,347 | 10/1993 | Bagnoli et al. | 395/293 |
| 5,416,910 | 5/1995 | Moyer et al. | 395/293 |
| 5,438,666 | 8/1995 | Craft et al. | 395/842 |
| 5,455,912 | 10/1995 | Ludwig | 395/293 |

*Primary Examiner*—Gopal C. Ray
*Attorney, Agent, or Firm*—Ladas & Parry

[57] ABSTRACT

A programmable multi-level bus arbitration apparatus for computer systems which implements dynamic arbitration for the grant of control over a system bus by one of a number of bus master devices. A number of programmable restricters each receive a system bus request signal issued by a corresponding one of the bus master devices competing for the control over the system bus. The restricters block or relay the bus request signal. A programmable priority arbiter receives an output of each of the restricters for arbitration to grant control of the system bus to a selected one of the bus master devices based on a pre-programmed priority scheme. A communication protocol handler receives and monitors the status of the bus enable signal for generating a bus busy signal to control the issuing of a verified bus request signal by one of the restricters or the blocking of the bus request signal based on the status of the bus busy signal.

5 Claims, 3 Drawing Sheets

PROGRAMMABLE MULTI-LEVEL BUS ARBITRATION APPARATUS IN A DATA PROCESSING SYSTEM

BACKGROUND OF THE INVENTION

1. Field of the Invention

The present invention relates in general to bus arbitration apparatus for computer systems. In particular, the present invention relates to an apparatus for programmable multi-level bus arbitration for computer systems. More particularly, the present invention relates to a programmable multi-level bus arbitration apparatus for microprocessor-based computer systems capable of allowing bus master devices with higher priority to interrupt other masters for real-time applications.

2. Technical Background

In typical microprocessor-based computer systems, there are occasions when bus master devices residing on the system bus need to take immediate control of the system to execute specific computing tasks. Typical prior art computer systems allow a bus master device to maintain continuous control over the entire system until it concludes its task, or its assigned time slot in its mastering cycle expires and it relinquishes control of the bus.

Frequently, certain bus master-initiated tasks require an extended time period to process the tasks. In order to maintain the entire computer system in a smooth operating mode, some prior art computer systems employ a bus arbitration strategy which limits the maximum time period a bus master can occupy the entire system. Once the set time period expires, any master device must surrender control of the bus back to the system, whether or not it had completed its intended task. The unfinished task can only be continued when the bus arbiter of the system grants it control over the bus again.

Such mandatory interruption of bus mastering tasks is necessary to sustain proper operation of the computer system. The typical microprocessor-based computer system has certain house-keeping operations that must be taken care on a timely basis. For example, main memory blocks of the computer system, which usually consist of arrays of dynamic random access memory chips, require periodic "refreshing" to prevent data bits contained therein from disappearing. Similarly, a communication processing hardware subsystem in the computer system can not break line connection for an extended period of time without losing information bits it is supposed to receive.

However, this prior art scheme of bus control arbitration based on a fixed time period for all bus mastering tasks is not suitable for certain applications involving real-time data processing by the system. Certain computation-intensive real-time applications, such as video and audio processing, as well as power conservation management of the computer system, typically require almost immediate processing by either the central processing unit (CPU) of the system or any bus master residing on the system bus. Failure to attend to the needs of these processing requirements might lead to system malfunction.

SUMMARY OF THE INVENTION

It is therefore an object of the present invention to provide for a computer system a programmable multi-level bus arbitration apparatus capable of allowing a dynamic and programmable priority arrangement for categorized interrupts issued by bus master devices.

It is another object of the present invention to provide for a computer system a programmable multi-level bus arbitration apparatus capable of allowing a bus master device having higher designated priority to interrupt another master device currently controlling the system bus, even though the master device controlling the system bus has not yet completed its allotted time period of control to control the bus.

The present invention achieves the above indicated objects by providing a programmable multi-level bus arbitration apparatus for computer systems which implements dynamic arbitration for the grant of control over the system bus by one of a number of bus master devices. A number of programmable restricters each receive a system bus request signal issued by a corresponding one of the bus master devices competing for the control over the system bus. The restricters block or relay the bus request signal. A programmable priority arbiter receives an output of each of the restricters for arbitration to grant control of the system bus to a selected one of the bus master devices based on a pre-programmed priority scheme. A communication protocol handler receives and monitors the status of the bus enable signal for generating a bus busy signal to control the issuing of a verified bus request signal by one of the restricters or the blocking of the bus request signal based on the status of the bus busy signal.

BRIEF DESCRIPTION OF THE DRAWINGS

Other objects, features and advantages of the present invention will become apparent by way of the following detailed description of a preferred but nonlimiting embodiment. The description is made with reference to the accompanied drawings, wherein.

DETAILED DESCRIPTION OF A PREFERRED EMBODIMENT

Bus arbitration devices (also known as arbiters) in a conventional computer system typically issue a signal to the system indicating the bus busy status once a bus master device is allowed to gain control of the system bus. The same bus busy signal is also received by all other bus master device currently residing on the system bus, so that no bus request will be issued by any of these other master devices during the time period when the controlling master device is accessing the system resources via the system bus.

Figure 1:
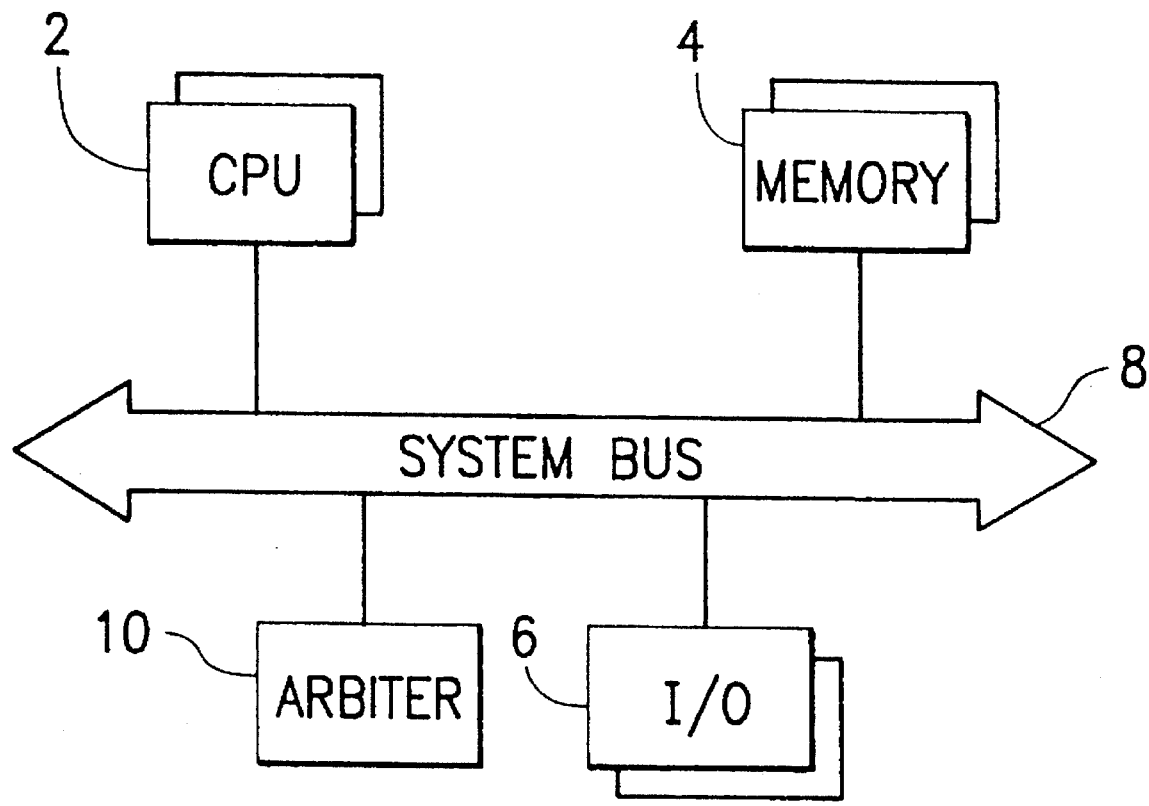
FIG. 1 shows a block diagram of a typical computer system which may implement the present invention.

Referring to FIG. 1, a block diagram of a typical computer system is shown. One or more CPUs 2, interconnect with one or more memory devices 4 and Input/Output (I/O) devices 6 over system bus 8. Bus arbitration device 10 is connected to system bus 8 and performs its arbitration function. Other devices, known to those skilled in the art, such as network interfaces and controllers (not shown) can be included as part of the overall computer system.

When a CPU or an I/O device wants to initiate a transaction it typically would like to maintain control over the system bus. As such, the initiator requests that it become a bus master. Memory devices, typically do not initiate transactions and are generally consider slave devices.

Figure 2:
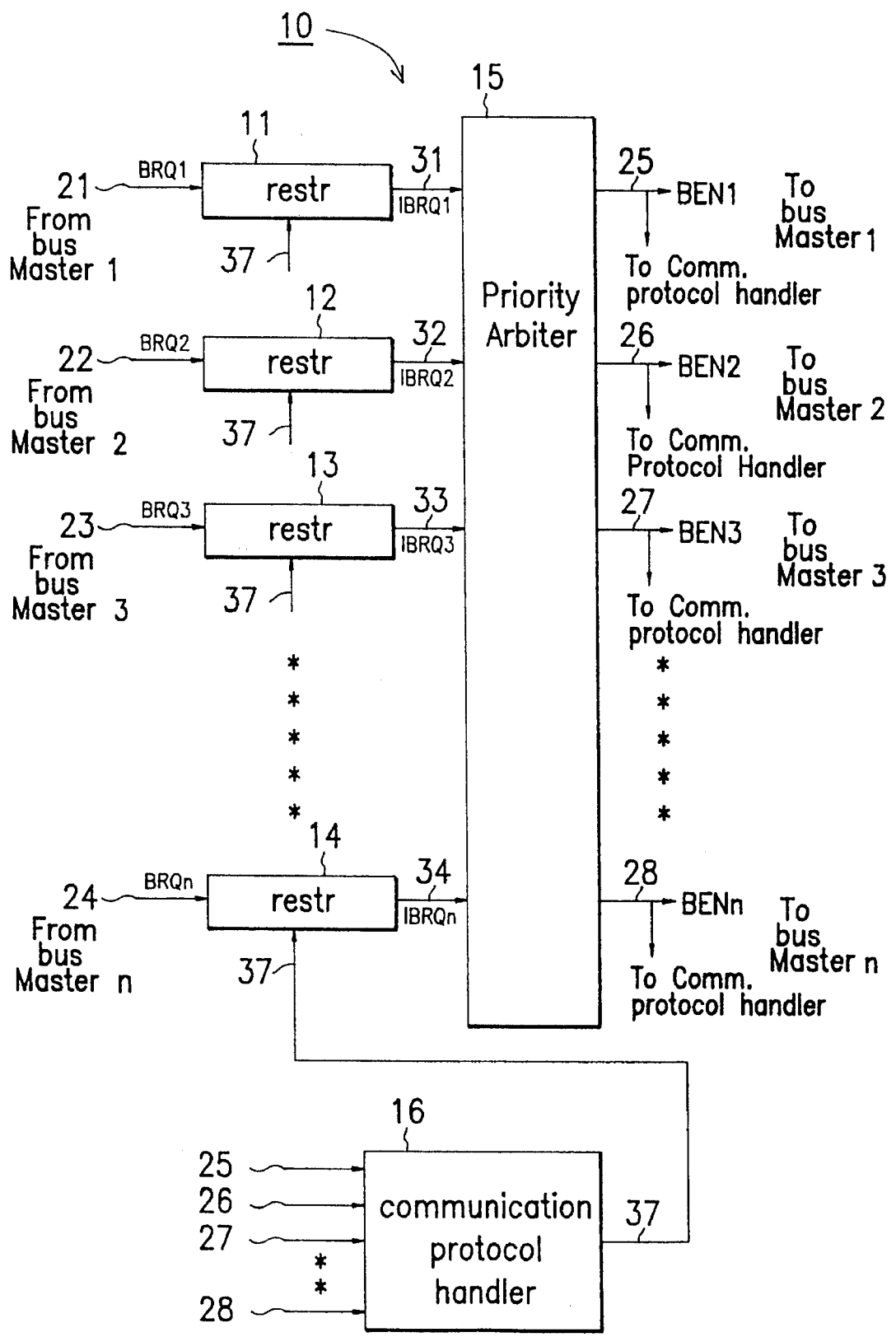
FIG. 2 shows a block diagram of the logic circuitry of a programmable multi-level bus arbitration apparatus in accordance with a preferred embodiment of the present invention.

Referring to FIG.2, a block diagram of the logic circuitry of arbiter 10, a programmable multi-level bus arbitration apparatus in accordance with a preferred embodiment of the present invention, is shown. Programmable multi-level bus arbitration apparatus 10 includes priority arbiter 15, communication protocol handler 16, and a number of restricters 11, 12, . . . , 14.

Assuming a number of n bus master devices (not shown in the drawing) residing on the system bus, each issuing its respective requests for control over the system bus via request signals $BRQ_1$, $BRQ_2$, . . . , $BRQ_4$ as designated by reference numerals 21, 22, . . . and 24 respectively. Request signals 21–24, pass through to priority arbiter 15, if allowed under the control of communication protocol handler 16. Bus requests 21–24, after having been prioritized in priority arbiter 15, are processed and cause the host system to respond correspondingly by granting bus control to the one bus master device that gets the priority by receiving the corresponding one of bus enable signals $BEN_1$, $BEN_2$, . . . , $BEN_n$, designated respectively by reference numerals 25, 26, . . . , 28. The output of priority arbiter 15, namely bus enable signals 25–28 is also monitored and processed by communication protocol handler 16. Communication protocol handler 16 issues bus busy signal 37, which acts as a gating control signal, for effecting the verification and restriction to restricters 11–14 as mentioned above.

If more than one bus master device residing on system bus is requesting control over the system bus at the same time, or, if any master device is requesting control while another one has already taken control of the system bus, priority arbiter 15 receives bus request signals 21–24 issued by the devices and arbitrates to select one master device with the highest priority at that particular instant. The selection is based on a predetermined, or pre-programmed priority scheme, or, in other words, the arbitration standard can be programmed based on the special requirements of the computer system. The discrimination standard can incorporate considerations such as whether or not a master device which has not yet completed its assigned time slot should be interrupted and a pre-mature transfer of control be forced to a master device that has been assigned a higher priority.

One occasion for such a mandatory transfer of bus control would be, for example, when a relatively slow DMA (direct memory access) operation is taking place under control of a bus master residing on the system bus. In general, data transfers involving DMA would normally require more than one assigned time slot to complete the mass data transfer typical in these DMA operations. If during such DMA transfer, a real-time processing requirement, for example, a situation involving a video or audio signal, which needs to be processed by some other master device, the DMA transfer that is under way will be immediately suspended by forced relinquishing of its control of the system bus. Control over the system bus is then immediately granted to the new master device responsible for the high-priority real-time processing. If the master device processing the video or audio requirement is asked to wait until the current DMA master finishes its current time slot, there is then the likelihood that the system may lose track of the video or audio data. In video situations, unwanted snow might then be exhibited on a display screen. In audio situations, there might occur undesirable interruptions in sound projection.

Still referring to FIG. 2, a detailed description of the operation of the programmable multi-level bus arbitration apparatus follows. Assuming the priority arrangement for the n bus master devices residing on the system bus of the host computer system is set to allow for the n-th device to have the highest and the first device the lowest priority. In terms of priority arrangement, master device n>master device n−1 > . . . >master device 3>master device 2>master device 1. Furthermore, a register in the restricter corresponding to master device 3 is set to flag ON. All other restricters have their internal registers set to flag OFF so as to allow only master device 3 the right to interrupt another master device's control over the system bus. This allows for the programmable and multi-level arrangement of the priority level. One level being the arrangement of the ordering of the n master devices arranged in a given priority order, such as has been described above, and the other being the setting or programming of the register flagging content that allows a selected master device to have the authority to interrupt the control of the system bus gained by other master devices.

Under normal conditions, when one of the n bus masters gains control over the system bus, communication protocol handler 16 issues bus busy signal 37 at its output, signifying that the system bus is occupied already and that no other master device can gain control over the system bus before the current mastering cycle is completed normally. This is achieved by allowing communication protocol handler 16 to issue its bus busy signal 37 to restricters 11–14 for each of the bus masters. All restricters 11–14 except the one having a flag set to ON, or "masked ON," i.e., restricter 13 in the above example, are not allowed to permit its corresponding interrupt request signal to be relayed therethrough to priority arbiter 15, thus blocking chance of pre-mature transfer of bus control to a second master device before its normal time slot expires.

In other words, among the n bus masters residing on the system bus, only interrupt request $BRQ_3$ 23 issued by master device 3 is allowed to be relayed as a verified version of interrupt request signal $IBRQ_3$ 33 and pass through restricter 13 to priority arbiter 15 and be subject to priority arbitration, thereby having a chance to gain immediate control over the system bus, if it is arbitrated to do so. All other interrupt request signals $BRQ_1$ 21, $BRQ_2$ 22 and $BRQ_n$ 24 issued by other master devices will be blocked, or masked off, at their respective restricters 11, 12 and 14.

Thus, all restricters, except those ones having the internal flag register set to ON, do not have a chance to negotiate a mandatory taking over of bus control as does the restricter that is masked ON, restricter 13 in the example. All the master devices behind the masked off restricters must wait for the current commanding master device to expire its time slot and automatically surrender its control over the system bus before they can have a chance to gain control of the system bus.

If any master device residing on the system bus issues a request signal asking for control over the system bus while the bus is free or not under control of any bus master device, then bus busy signal 37 as generated by communication protocol handler 16 would be in an deactivated state. The gating of this deactivated bus busy signal as applied on all n restricters 11–14 will allow them to be in masked ON status. In other words, all n restricters 11–14 will allow their respective bus request signals 21-24 to be relayed as verified request signals 31-32 to priority arbiter 15 for arbitration. Under this circumstance, the incoming bus requests would be processed by priority arbiter 15 in accordance with the pre-programmed priority scheme to decide which request receives the grant of control over the system bus.

For example, consider the situation when both the first and second bus master devices issue their request for bus control simultaneously, and as the circumstance indicated above, there is currently no other master device accessing the system bus, then their bus request signals $BRQ_1$ 21 and $BRQ_2$ 22 will all be relayed by their respective restricters 11 and 12 to priority arbiter 15 as verified bus request signals $IBRQ_1$ and $IBRQ_2$ for competition over the control of the system bus. Assuming that the priority arrangement is the same as in the above described example, that is, the second master device enjoys higher priority than the first device, then priority arbiter 15 will accordingly issue bus enable signal $BEN_2$ 26 and sends the signal to the second master device, thereby granting the control of the system bus to the second master device.

As described above, all bus enable signals $BEN_1$, $BEN_2$, ..., $BEN_n$, as designated by reference numerals 25, 26, ..., 28, which are utilized to inform the respective bus master device of the grant of bus control, are also constantly monitored by communication protocol handler 16. Upon acknowledging the status change of the active bus enable signal, in this case enable signal $BEN_2$ for the second master device, communication protocol handler 16 issues active bus busy signal 37 and sends it to the gating input of each of the restricters 11-14. Since only restricter 13 for the third bus master device is masked ON, all restricters except restricter 13 will then be blocking the bus request signals issued by their respective bus master device. Under this circumstance, only the third master device can, if the need arises, issue its bus request signal $BRQ_3$ 23 and actually get relayed by its masked ON restricter 13 as verified request signal $IBRQ_3$ 33 and be received by priority arbiter 15 for discrimination as to whether or not to obtain immediate control over the system bus by immediately terminating the current active bus master device, namely the second bus master. Based on the above assumption, since the third master device was assigned higher bus priority than the second master device, the current active second master device will therefore be forced to suspend its current operation and surrender its control over the system bus. Priority arbiter 15, as a result, withdraws its bus enable signal $BEN_2$ 26 for the second master device, and issues newly active bus enable signal $BEN_3$ 27 to inform the third device of the grant of control of the system bus.

During the process of the switching from bus enable signal $BEN_2$ 26 to $BEN_3$ 27, communication protocol handler 16 can maintain its bus busy signal 37 in active state, signifying that the system bus is still under occupation by some master device. All master devices can not have a chance to have its interrupt request processed by priority arbiter 15, unless its corresponding restricter is pre-programmed at masked ON status.

Figure 3:
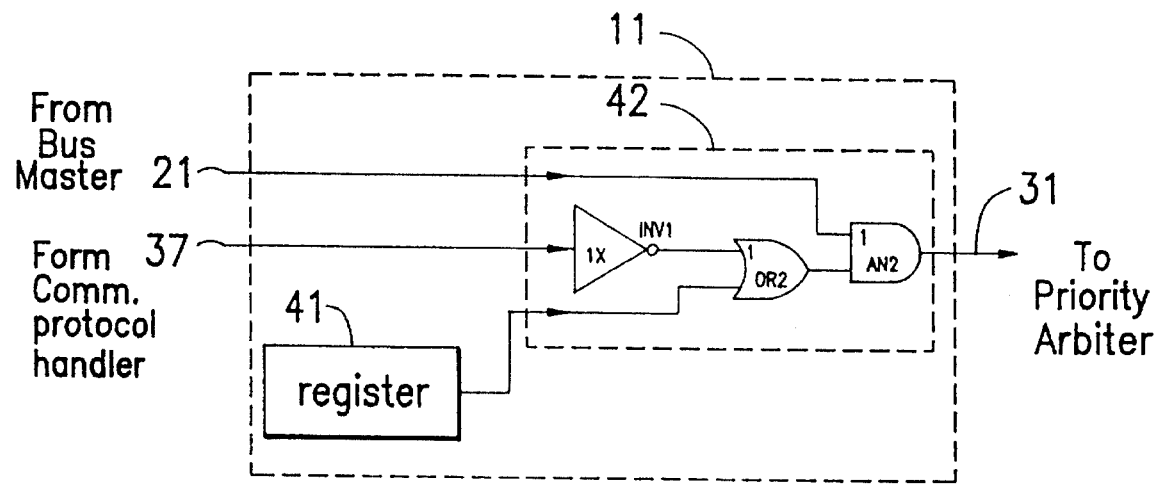
FIG. 3 shows the schematic diagram of a preferred embodiment of a priority restrict device employed in a restricter for use in the programmable multi-level bus arbitration apparatus of the present invention.

Referring next to FIG. 3, a schematic diagram of a preferred embodiment of a priority restrict device 42 employed in restricters 11-14 for the programmable multi-level bus arbitration apparatus is shown. As described above, each restricter 11-14 for filtering bus request signals 21-24 issued by its corresponding bus master device is utilized to control whether or not to allow its master device to gain mandatory control and pre-mature take-over of the system bus by programming a flagging, or masking bit.

As described previously, priority arbiter 15 of the programmable multi-level bus arbitration apparatus is utilized to arbitrate the grant of system bus control to a master device in accordance with the pre-determined priority scheme. The restricter, on the other hand, is utilized to mask, also in accordance with the pre-determined standard, the bus requests issued by each of the master devices to decide whether or not each master device has the opportunity to submit its bus request signal for the arbitration of the priority arbiter to decide if it can gain immediate control over the system bus, even if there is already one bus device controlling the access over the bus.

One embodiment of priority restrict device 42 is shown in FIG. 3 and includes a combination of three logic gates. Restricter 11, for example, is consists primarily of priority restrict device 42 and register 41, which is utilized for storing the masking bit described above. Based on the logic circuitry shown in FIG. 3 priority restrict device 42 receives bus request signal $BRQ_1$ 21, issued by, in this case the first bus master device. Bus request signal $BRQ_1$ 21 is then processed accordingly as to whether to send or not send verified bus request signal $IBRQ_1$ 31 to priority arbiter 15, based on both the status of the content of register 41 and bus busy signal 37. In the logic circuitry shown, if the single-bit content of register 41 is a logical one, then bus request $BRQ_1$ 21 will be relayed to priority arbiter 15 regardless of the status of bus busy signal 37. If the mask bit is set to ON, then the bus request signal can be relayed, even though there is already a bus master device controlling the system bus as reflected by active bus busy signal 37.

On the other hand, if register 41 is programmed to contain a logical zero, then the bus request issued by the master device can only get relayed to the priority arbiter when the bus busy signal is inactive. In other words, if register 41 contains a masked OFF bit, then the bus request can only have a chance to be examined by priority arbiter 15 when there is no master device controlling the system bus. If there is, the bus master is said to be blocked from the priority arbitration of priority arbiter 15.

Thus, the combination of priority arbiter 15 and the multiple restricters 11-14 provides the ability of being both a programmable and a multiple-leveled bus arbitration mechanism. Programmable refers collectively to both the restricters' blocking capability as being programmable and also the priority arbitration scheme as discriminated by the priority arbiter as being programmable, in order to adapt to different applications of the computer system. On the other hand, multi-leveled refers to having at one level a priority arrangement, as discriminated by a priority arbiter, which can be pre-programmed, and having at another level, a mask bit for restricters, which can be pre-programmed. Moreover, as persons skilled in this art are aware, the programming of both the priority scheme as well as the mask bit can all be done on-line by software.

The above description mentions the situation wherein only one bus master device is programmed to be allowed to compete for immediate bus take over. As persons skilled in this art can easily appreciate, more than one restricter can be masked ON to allow more than one bus master device to compete to win control over the system bus. As an example, if restricter 12 for the second master device and restricter 14 for the n-th master device both have their mask bits as stored in register 41 of the corresponding restricter set to ON, then both the bus master devices can compete for control of the system bus. If the second master device has already been granted control at the beginning, when the n-th master device later issues its request, then since the n-th master device is enjoying the higher priority, the second master device will be immediately forced to hand over its control of the system bus. This, of course, again assumes the previous priority arrangement wherein the n-th master device is assigned the highest priority and the first device the lowest priority. Naturally, the priority scheme can be altered as discussed above.

On the other hand, if the n-th master device gained control over the system bus first and later the second device issues its request for control of the system bus, then since the second device does not possess a priority higher than that of the n-th master device, the current bus master, the n-th bus master would not relinquish its control over the system bus.

Figure 4:
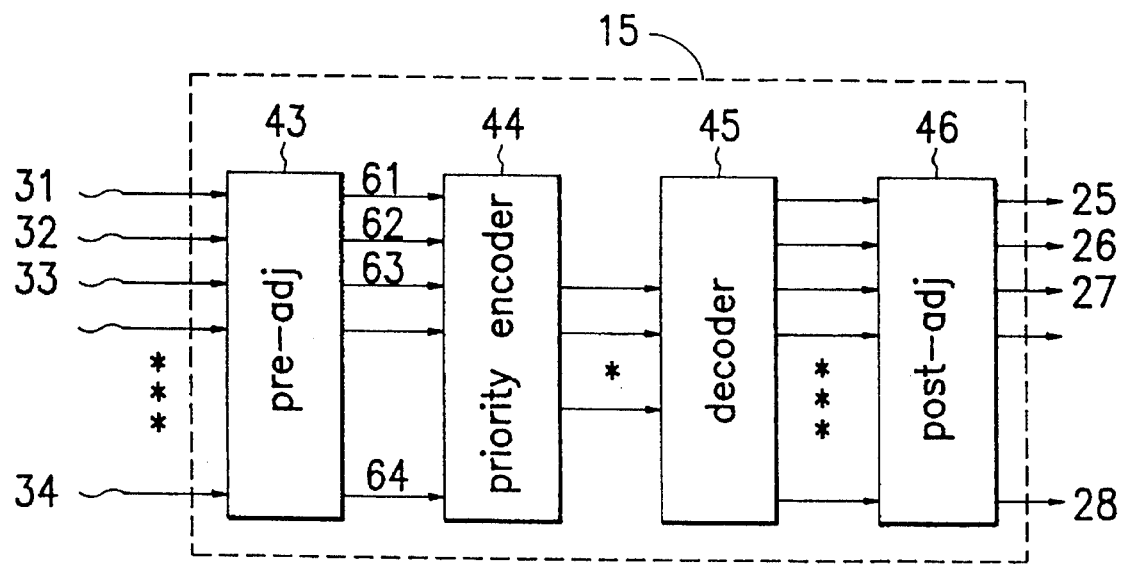
FIG. 4 shows a block diagram of a priority arbiter in accordance with a preferred embodiment of the present invention.

Next, referring to FIG. 4, a block diagram of priority arbiter 15 in accordance with a preferred embodiment of the present invention is shown. Priority arbiter 15 is shown to include pre-adjustment device 43, priority encoder 44, decoder 45, and post-adjustment device 46.

In the previous description for the programmable and multi-level bus arbitration apparatus of FIG. 2, it was assumed that the priority arrangement is set up so the n-th bus master device has the highest priority while the first device has the lowest. If the application of the computer system requires an adjustment to the priority scheme other than the one described above, priority arbiter 15 can undergo a modification of its priority scheme by adjusting the priority routing information contained in both pre-adjustment device 43 and post-adjustment device 46. This modification can be done by the computer system itself under system software control at the operating system level. New priority routing information can be fetched into pre- and post-adjustment devices 43 and 46 respectively to implement on-line modification of the priority scheme.

Priority encoder 44 encodes the priority routing information stored in pre-adjustment device 43 and then fetches the encoded priority information to decoder 45 for decode. The decoded information is then fetched to post-adjustment device 46 for proper renewed assignment of bus enable signals 25, 26, . . . , 28.

As is known to those skilled in the art, the host CPU of the computer system, under the control of the operating system for the computer system, can implement the modification to the priority scheme on-line. Moreover, the modification can be implemented anytime, thereby allowing a dynamic adjustment to the priority scheme, providing even more flexibility to the computer system.

It should be pointed out that although the description of the present invention was made based on a limited number of embodiments, however, the scope of the disclosure of the present invention is not constrained therewith. For example, the programmable multi-level bus arbitration apparatus can be applied to computer system allowing the residence of bus slave devices on the system bus.

I claim:

1. A programmable multi-level bus arbitration apparatus for a computer system wherein said computer system includes a central processing unit, a system bus, and a plurality of bus master devices residing on said system bus, said bus arbitration apparatus comprising:

a plurality of programmable restricters each receiving a system bus request signal issued by a corresponding one of said plurality of bus master devices for control over said system bus by blocking of said bus request signal or allowing relaying said bus request signal as a verified bus request signal;

a programmable priority arbiter receiving an output of each of said plurality of restricters for arbitration of granting control of said system bus to selected one of said plurality of bus master devices based on a priority scheme pre-programmed therein to said priority arbiter by issuing a bus enable signal to said selected bus master device; and a communication protocol handler receiving and monitoring the status of said bus enable signal for generating a bus busy signal to control the issuing of said verified bus request signal by one of said plurality of restricters or said blocking of said bus request signal based on the status of said bus busy signal.

2. The programmable multi-level bus arbitration apparatus of claim 1, wherein the programmable priority arbiter further comprises a pre-adjustment device, a priority encoder, a decoder, and a post-adjustment device, wherein:

said pre-adjustment device and post-adjustment device each receives a set of priority routing information sent by said computer system for re-arranging said priority scheme stored in said programmable priority arbiter;

said priority encoder encodes the routing information received by said pre-adjustment device for re-arrangement of said priority scheme;

said decoder decodes the routing information encoded by said priority encoder; and said post-adjustment device adjusting and generating said rearranged priority scheme by processing said priority routing information stored therein and said decoded routing information.

3. The programmable multi-level bus arbitration apparatus of claim 2, wherein said plurality of restricters further comprising a priority restrict device and a mask register, wherein:

said priority restrict device relaying said bus request signal issued by one of said plurality of bus master devices to said programmable priority arbiter if said system bus is not occupied by any one of said bus master devices;

said priority restrict device blocking said bus request signal issued by one of said plurality of bus master devices if said mask register has programmed therein a masking-off bit and said system bus has already been occupied by one of said bus master devices; and said priority restrict device relaying said bus request signal issued by one of said plurality of bus master devices to said programmable priority arbiter for arbitration of immediate take over of the control over said system bus based on said priority scheme stored therein if said mask register has programmed therein a masking-on bit and said system bus has already been occupied by one of said bus master devices.

4. The programmable multi-level bus arbitration apparatus of claim 3, wherein said programmable priority arbiter comprises combinational logic circuitry.

5. The programmable multi-level bus arbitration apparatus of claim 4, wherein said system bus of said computer system further has bus slave devices residing thereon.

* * * * *